(12) United States Patent
Kang et al.

(10) Patent No.: US 10,474,861 B2
(45) Date of Patent: Nov. 12, 2019

(54) METHOD AND ELECTRONIC DEVICE FOR DRIVING FINGERPRINT SENSOR

(71) Applicant: Samsung Electronics Co., Ltd., Gyeonggi-do (KR)

(72) Inventors: Do Hee Kang, Gyeonggi-do (KR); Jung Sik Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 92 days.

(21) Appl. No.: 15/525,647

(22) PCT Filed: Nov. 18, 2015

(86) PCT No.: PCT/KR2015/012418
§ 371 (c)(1),
(2) Date: May 10, 2017

(87) PCT Pub. No.: WO2016/080761
PCT Pub. Date: May 26, 2016

(65) Prior Publication Data
US 2017/0323135 A1 Nov. 9, 2017

(30) Foreign Application Priority Data
Nov. 18, 2014 (KR) .................. 10-2014-0161125

(51) Int. Cl.
*G06K 9/20* (2006.01)
*G06K 9/36* (2006.01)
(Continued)

(52) U.S. Cl.
CPC .......... *G06K 9/0002* (2013.01); *G06F 3/044* (2013.01); *G06K 9/00006* (2013.01);
(Continued)

(58) Field of Classification Search
CPC ....................................... G06K 9/00006–0012
See application file for complete search history.

(56) References Cited

U.S. PATENT DOCUMENTS 5,793,303 A 8/1998 Koga
7,366,497 B2 4/2008 Nagata
(Continued)

FOREIGN PATENT DOCUMENTS

EP 1 536 617 A1 6/2005
EP 2 695 041 B1 2/2014
(Continued)

OTHER PUBLICATIONS

European Search Report dated Oct. 27, 2017.
International Search Report dated Feb. 24, 2016.

*Primary Examiner* — Brian Werner
(74) *Attorney, Agent, or Firm* — Cha & Reiter, LLC.

(57) ABSTRACT

An electronic device includes: a wireless communication module configured to perform wireless communication in a first state; a fingerprint sensor configured to sense a fingerprint in a second state; and at least one processor electrically connected to the wireless communication module and the fingerprint sensor, wherein the processor changes the first state or the second state based on at least part of an operating state of the wireless communication module or the fingerprint sensor.

21 Claims, 10 Drawing Sheets

(51) Int. Cl.
   *G06K 9/00* (2006.01)
   *H04B 7/08* (2006.01)
   *H04L 29/06* (2006.01)
   *H04W 12/06* (2009.01)
   *G06F 3/044* (2006.01)

(52) U.S. Cl.
   CPC ....... *H04B 7/0805* (2013.01); *H04L 63/0861* (2013.01); *H04W 12/06* (2013.01); *G06F 2203/04108* (2013.01)

(56) References Cited

U.S. PATENT DOCUMENTS

| | | | |
|---|---|---|---|
| 7,505,611 B2 | 3/2009 | Fyke | |
| 7,646,897 B2 | 1/2010 | Fyke | |
| 7,852,325 B2 | 12/2010 | Fu et al. | |
| 7,881,507 B2 | 2/2011 | Fyke | |
| 8,160,313 B2 | 4/2012 | Fyke | |
| 8,189,881 B1 | 5/2012 | Smits | |
| 8,456,450 B2 | 6/2013 | Land et al. | |
| 9,030,421 B2 | 5/2015 | Tseng et al. | |
| 9,063,583 B2 | 6/2015 | Kim et al. | |
| 9,325,253 B2 | 4/2016 | Land et al. | |
| 2003/0189480 A1 | 10/2003 | Hamid | |
| 2003/0198307 A1* | 10/2003 | Neill | H04B 15/02 375/346 |
| 2004/0155752 A1* | 8/2004 | Radke | G06K 9/00013 340/5.53 |
| 2005/0113071 A1* | 5/2005 | Nagata | H04M 1/0214 455/411 |
| 2005/0259851 A1 | 11/2005 | Fyke | |
| 2008/0165157 A1 | 7/2008 | Fu et al. | |
| 2009/0002343 A1 | 1/2009 | Land et al. | |
| 2009/0221272 A1 | 9/2009 | Fyke | |
| 2010/0112984 A1 | 5/2010 | Fyke | |
| 2011/0069031 A1 | 3/2011 | Fu et al. | |
| 2011/0182487 A1 | 7/2011 | Fyke | |
| 2012/0249449 A1 | 10/2012 | Tseng et al. | |
| 2012/0313901 A1* | 12/2012 | Monson | H01Q 1/2216 345/178 |
| 2013/0169584 A1* | 7/2013 | Konradi | G06F 3/044 345/174 |
| 2013/0241800 A1 | 9/2013 | Schlub et al. | |
| 2013/0250640 A1 | 9/2013 | Land et al. | |
| 2014/0002388 A1 | 1/2014 | Han et al. | |
| 2014/0225821 A1 | 8/2014 | Kim et al. | |
| 2015/0072627 A1* | 3/2015 | Balasubramanian | H04B 15/02 455/77 |
| 2015/0248209 A1 | 9/2015 | Kim et al. | |
| 2016/0231854 A1* | 8/2016 | Koo | G06F 3/03545 |

FOREIGN PATENT DOCUMENTS

| | | |
|---|---|---|
| EP | 2 765 760 A1 | 8/2014 |
| KR | 10-2005-0082076 A | 8/2005 |
| KR | 10-2013-0066152 A | 6/2013 |
| WO | 01/59558 A1 | 8/2001 |
| WO | 2013/138007 A1 | 9/2013 |

* cited by examiner

[Figure 1]
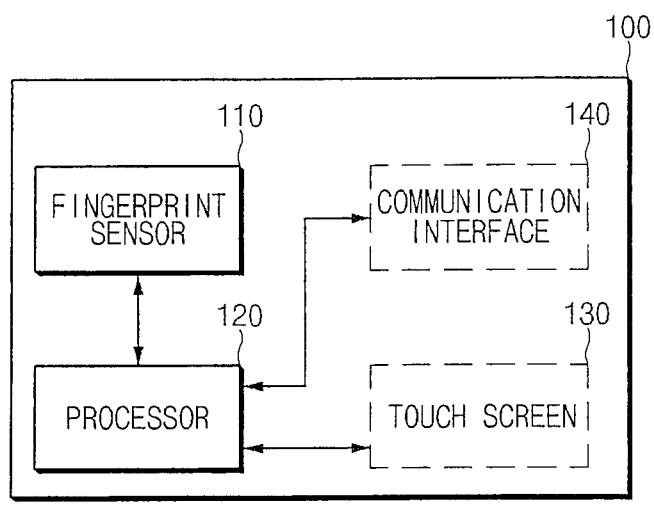

【Figure 2】
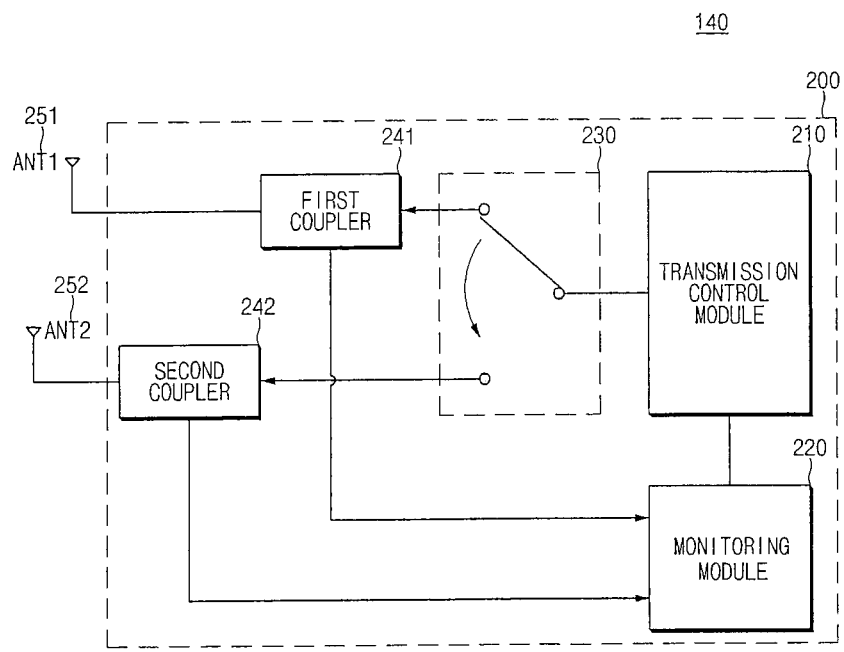

【Figure 3】
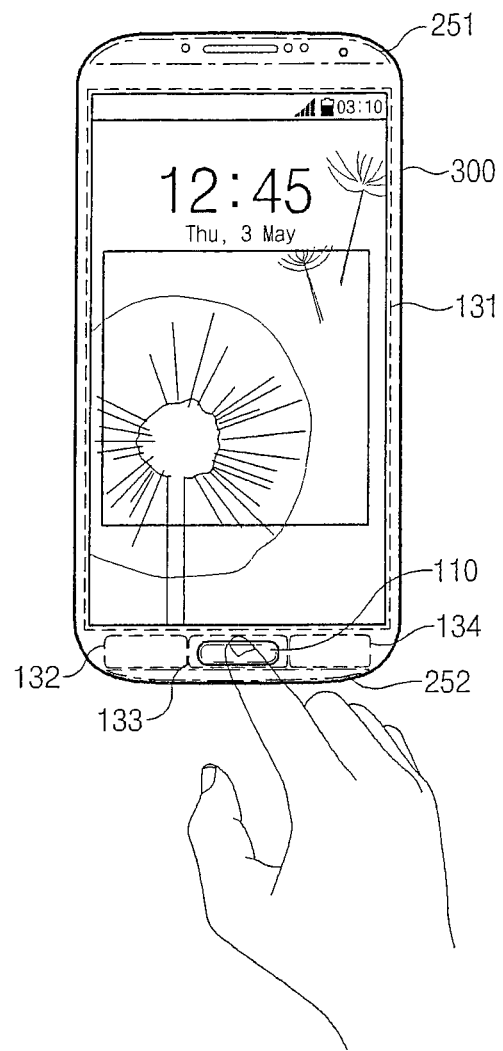

【Figure 4】
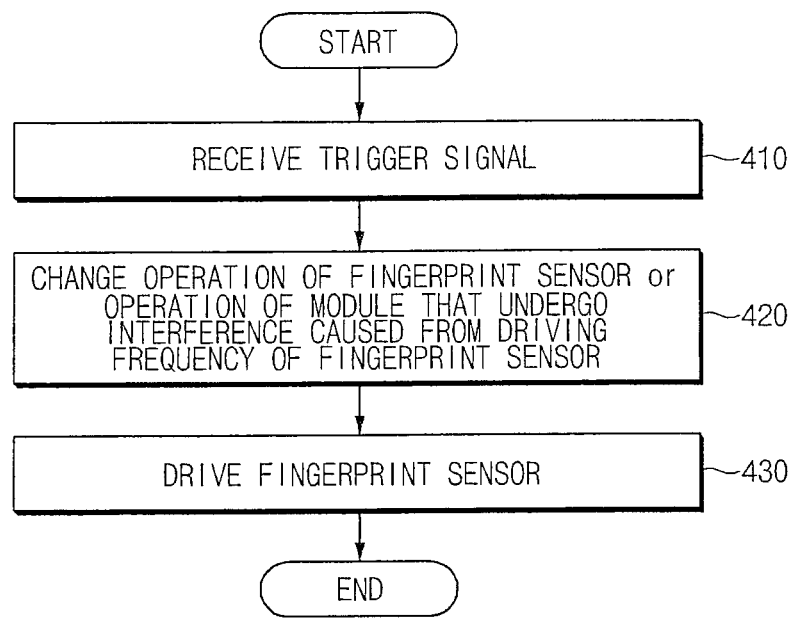

[Figure 5]
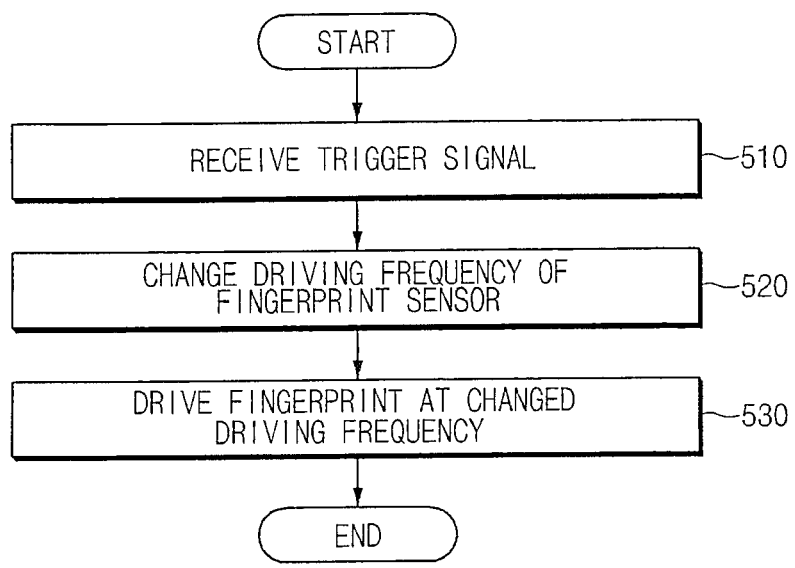

[Figure 6]
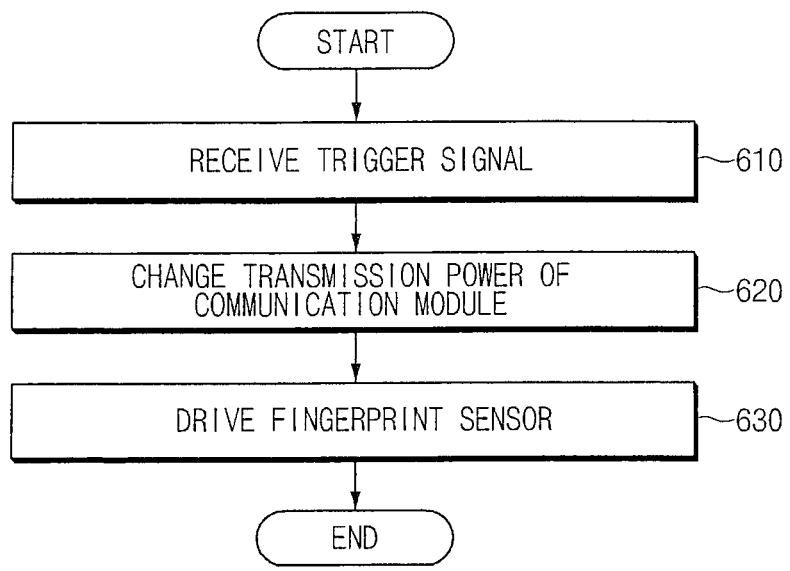

【Figure 7】
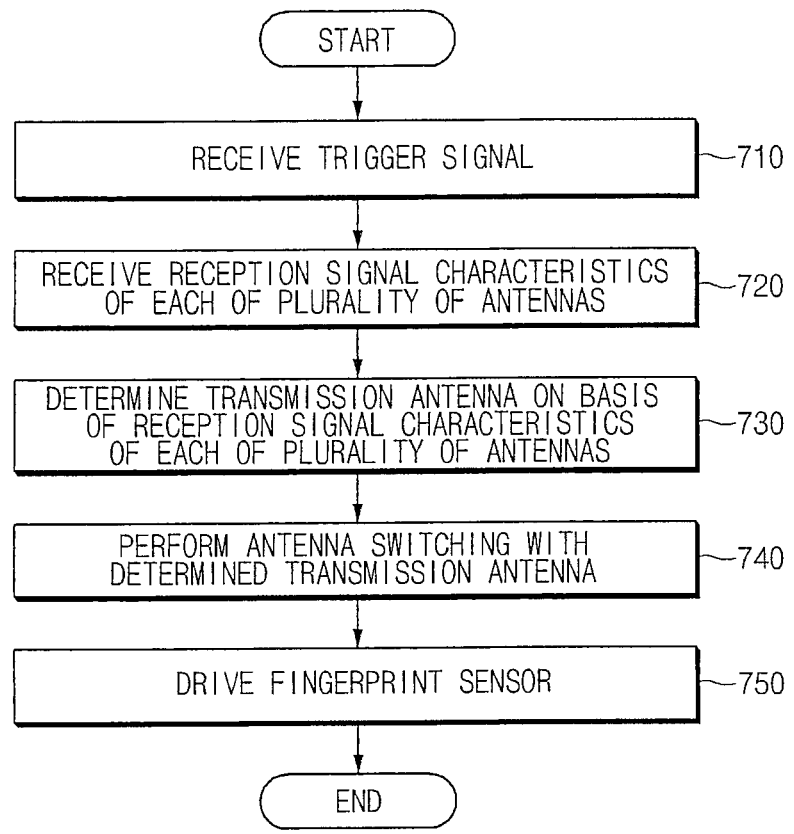

[Figure 8]
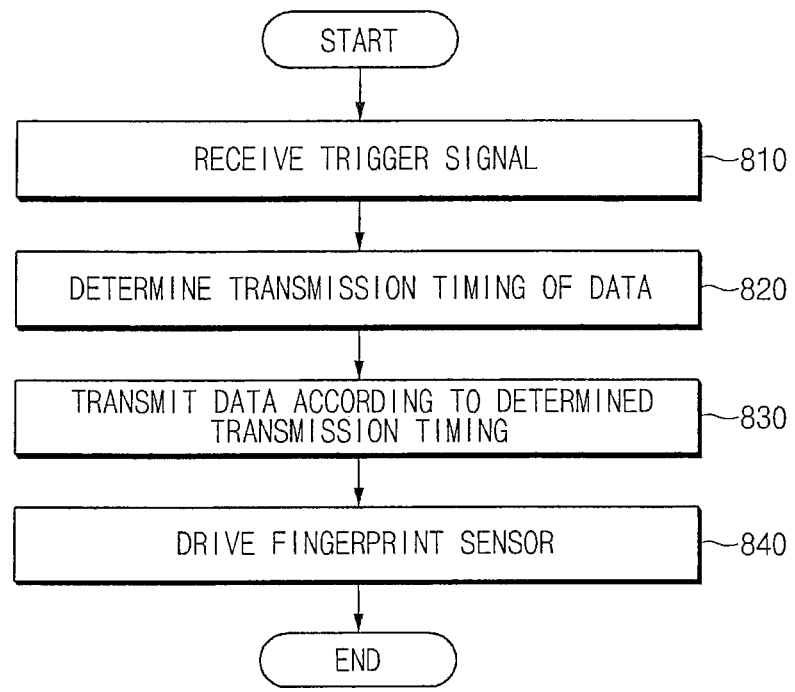

【Figure 9】
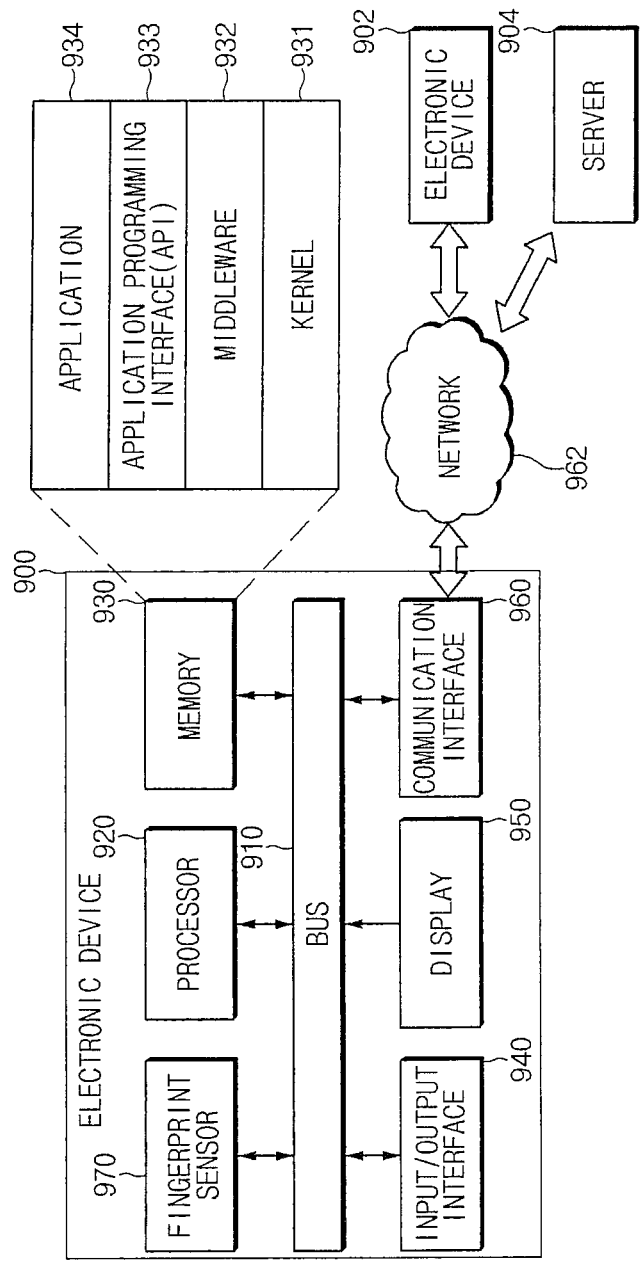

[Figure 10]
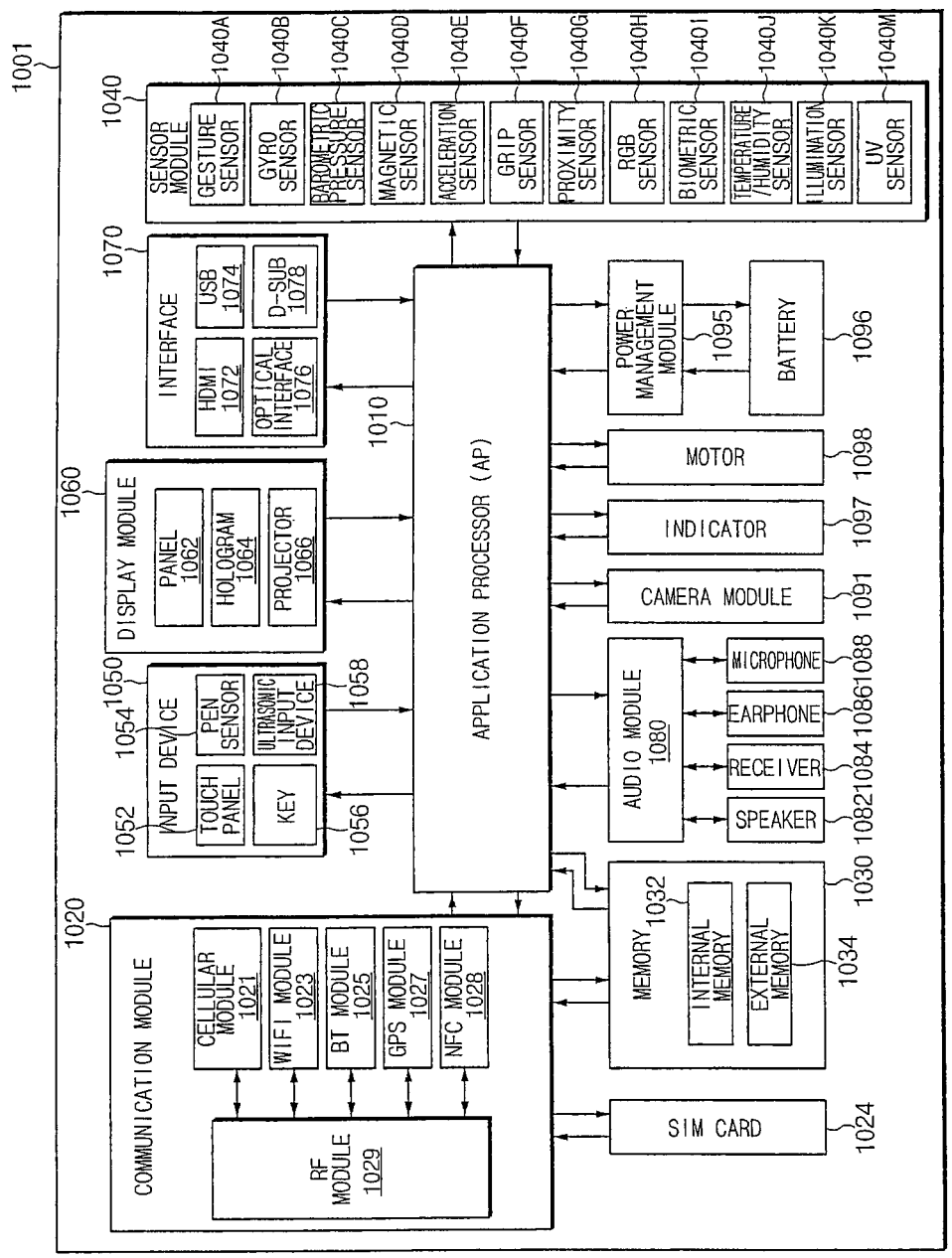

METHOD AND ELECTRONIC DEVICE FOR DRIVING FINGERPRINT SENSOR

CLAIM OF PRIORITY

This application is a National Phase Entry of PCT International Application No. PCT/KR2015/012418, which was filed on Nov. 18, 2015, and claims a priority to Korean Patent Application No. 10-2014-0161125, which was filed on Nov. 18, 2014, the contents of which are incorporated herein by reference.

TECHNICAL FIELD

The present disclosure relates to a method and electronic device for driving a fingerprint sensor.

BACKGROUND ART

With the development of an electronic device such as a note PC and a smartphone, the importance of information security is emphasized. By applying a variety of biometric recognition technologies to an electronic device, the security is enhanced. Fingerprint recognition among a variety of biometric recognition technologies can ensure a high security at a low cost and has been widely used due to the miniaturization of a fingerprint sensor.

DISCLOSURE

Technical Problem

When a fingerprint sensor is driven in an electronic device, some modules of the electronic device can undergo an interference caused from the harmonics of an operating frequency in the fingerprint sensor. Due to this, the antenna radiation performance of the electronic device can be deteriorated or the recognition rate of a fingerprint sensor can be reduced. Accordingly, measures for reducing the influence of an interference caused from the harmonics of an operating frequency in the fingerprint sensor are required.

Accordingly, an aspect of the present disclosure is to provide a method and electronic device for driving a fingerprint sensor.

Another aspect of the present disclosure is to provide a computer readable recording medium storing a program for executing the method for driving a fingerprint sensor in a computer.

Technical Solution

In accordance with an aspect of the present disclosure, an electronic device is provided. The electronic device includes: a wireless communication module configured to perform wireless communication in a first state; a fingerprint sensor configured to sense a fingerprint in a second state; and at least one processor electrically connected to the wireless communication module and the fingerprint sensor, wherein the processor changes the first state or the second state based on at least part of an operating state of the wireless communication module or the fingerprint sensor.

DESCRIPTION OF DRAWINGS

FIG. 1 is a block diagram of an electronic device that drives a fingerprint sensor according to various embodiments of the present disclosure.

FIG. 2 is a block diagram of a communication interface according to various embodiments of the present disclosure.

FIG. 3 is a block diagram of a fingerprint sensor in an electronic device according to various embodiments of the present disclosure.

FIG. 4 is a flowchart illustrating a method of changing and driving an operation of a fingerprint sensor or an operation of a module that undergoes an interference according to various embodiments of the present disclosure.

FIG. 5 is a flowchart illustrating a method of changing and driving a driving frequency of a fingerprint sensor according to various embodiments of the present disclosure.

FIG. 6 is a flowchart illustrating a method of changing and driving a transmission power of a communication module according to various embodiments of the present disclosure.

FIG. 7 is a flowchart illustrating a method of driving a fingerprint sensor by performing antenna switching according to various embodiments of the present disclosure.

FIG. 8 is a flowchart illustrating a method of changing a transmission timing of data and driving a fingerprint sensor according to various embodiments of the present disclosure.

FIG. 9 is a block diagram of an electronic device including a fingerprint sensor according to various embodiments of the present disclosure.

FIG. 10 is a block diagram of an electronic device according to various embodiments of the present disclosure.

MODE FOR INVENTION

Hereinafter, various embodiments of the present disclosure are disclosed with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

In various embodiments of the present disclosure, expression "A or B" or "at least one of A or/and B" may include all possible combinations of items listed together. For instance, the expression "A or B", or "at least one of A or/and B" may indicate include A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to various embodiments of the present disclosure may be a device with a camera function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to some embodiments of the present disclosure, an electronic device may be smart home appliances having a data storing function The smart home appliances may include at least one of, for example, televisions, digital video disk (DVD) players, audios, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to some embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' point of sales (POS).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments), each of which has a screen display function. An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, an electronic device according to various embodiments of the present disclosure will be described in more detail with reference to the accompanying drawings. The term "user" in various embodiments may refer to a person using an electronic device or a device using an electronic device (for example, an artificial intelligent electronic device).

FIG. 1 is a block diagram of an electronic device that drives a fingerprint sensor according to various embodiments of the present disclosure.

According to various embodiments of the present disclosure, an electronic device 100 may include a module (for example, a wireless communication module, an image processor, an application processor, and so on) operating in a first state, a fingerprint sensor 110 operating in a second state, and at least one processor 120 electrically connected to the fingerprint sensor 100 and the module. The at least one module included in the electronic device 100 in addition to the fingerprint sensor 110 may represent a module that undergoes an interference caused from an operating frequency of the fingerprint sensor 110. Hereinafter, for convenience of description, the module is described as a module that undergoes an interference caused from an operating frequency of the fingerprint sensor 110.

According to various embodiments of the present disclosure, the processor 120 may change a first state and/or a second state based on at least part of an operating state (for example, the first state) of the module in the electronic device 100 and/or an operating state (for example, the second state) of the fingerprint sensor 110.

In the above description, each of the first state or the second state may include at least one of a state of operating in a specified operating frequency of a corresponding module (for example, the fingerprint sensor 110 or the module), a state of operating in a specified operating power, and a state of operating based on a specified circuit path. The processor 120 may be configured to receive a first signal (for example, a trigger signal) for notifying an operation of the fingerprint sensor 110 and change a first frequency and/or a second frequency after the receiving of the first signal.

The first state of the module may include an operating state of the module (for example, a state in which the module operates with the first operating frequency, a state in which the module operates with the first operating power, or a state in which the module operates as a first circuit path). The second state of the fingerprint sensor 110 may include an operating state of the fingerprint sensor 110 (for example, a state in which the fingerprint sensor 110 operates with the second operating frequency, a state in which the fingerprint sensor 110 operates with the second operating power, or a state in which the fingerprint sensor 110 operates as a second circuit path). The operating states (for example, the first state and the second state) will be described with specific examples.

Referring to FIG. 1, the electronic device 100 may include the fingerprint sensor 110 and the processor 120. According to various embodiments of the present disclosure, the electronic device 100 may further include at least one of a touch panel 130 and a communication interface 140.

In this specification, only components relating to various embodiments of the present disclosure are described in order not to obscure the features of the present disclosure. Accordingly, it is apparent to those skilled in the art that general components other than the components shown in FIG. 1 may be further included.

In order to prevent the performance deterioration of at least one module caused from the harmonics of an operating frequency in the fingerprint sensor 110, the electronic device 100 may change an operation of the fingerprint sensor 110 or an operation of a module that undergoes an interference caused from an operating frequency of the fingerprint sensor 110 and may drive the fingerprint sensor 110.

The fingerprint sensor 110 may be driven according to a control signal of the processor 120. For example, the processor 120 may change an operation (for example, an operating frequency, an operating power, a circuit path, and so on) of the fingerprint sensor 110 or an operation (for example, an operating frequency, an operating power, a circuit path, and so on) of a module (for example, a wireless communication module, an image processor, an application processor, and so on) that undergoes an interference caused from an operating frequency of the fingerprint sensor 110. For example, when a control signal is transmitted to the fingerprint sensor 110, the fingerprint sensor 110 may be driven.

For example, a module that undergoes an interference caused from an operating frequency of the fingerprint sensor 110 may include an image processor, an application processor, an antenna, a communication module (for example, a wireless communication module), a cellular module, a Wi-Fi module, a GPS module, a Bluetooth module, a radio frequency (RF) module, and a near field communication (NFC) module. However, the present disclosure is not limited thereto and in addition to the above-listed modules, the electronic device 100 may further include at least one module that undergoes an interference caused from an operating frequency of the fingerprint sensor 110. Hereinafter, for convenience of description, a communication interface 140 including an antenna, a communication module (for example, a wireless communication module), a cellular module, a Wi-Fi module, a GPS module, a Bluetooth module, an RF module, and an NFC module is described as a module that undergoes an interference caused from an operating frequency of the fingerprint sensor 110.

According to various embodiments of the present disclosure, the fingerprint sensor 110 may be driven at a predetermined operating frequency. Alternatively, according to various embodiments of the present disclosure, an operating frequency of the fingerprint sensor 110 may change into various frequencies by the processor 120. An operating frequency of the fingerprint sensor 110 may be determined to be one of a plurality of frequencies at which the fingerprint sensor 110 is driven according to a control signal of the processor 120. When the operating frequency changes to the determined frequency, the fingerprint sensor 110 may be driven at the changed operating frequency.

According to various embodiments of the present disclosure, the fingerprint sensor 110 may be driven at a constant operating power. Alternatively, according to various embodiments of the present disclosure, an operating power of the fingerprint sensor 110 may change into various sizes of power by the processor 120. When the operating power of the fingerprint sensor 110 is changed, the fingerprint sensor 110 may be driven at the changed operating power.

According to various embodiments of the present disclosure, the fingerprint sensor 110 may be driven as a predetermined circuit path. The circuit path of the fingerprint sensor 110 may be determined to be one of a plurality of circuit paths through which the fingerprint sensor 110 is driven by the processor 120. When the circuit path of the fingerprint sensor 110 is changed, the fingerprint sensor 110 may be driven as the changed circuit path.

The fingerprint sensor 110 may perform the sensing of a fingerprint. The electronic device 100 according to this present disclosure may use the fingerprint sensor 110 of various methods such as optical methods, radio frequency (RF) methods, thermal detection methods, and ultrasonic methods. Additionally, the electronic device 100 may use the fingerprint sensor 110 combined with two or more methods.

According to various embodiments of the present disclosure, the fingerprint sensor 110 may include a swipe type and a touch type according to a type of sensing a fingerprint. The swipe type is to place the surface of a finger with a fingerprint on the fingerprint sensor 110 and swipe it in a predetermined direction. The touch type is to contact the surface of a finger on the fingerprint sensor 110 for a predetermined time. When the fingerprint sensor 110 is the swipe type or the touch type, the electronic device 100 may detect a pre-movement of fingerprint sensing by using a touch panel or a proximity sensor. A specific description relating thereto may refer to FIG. 3.

The fingerprint sensor 110 may transmit sensing data obtained through the sensing of a fingerprint to the processor 120. The processor 120 may perform image processing of sensing data and perform fingerprint authentication processing.

According to various embodiments of the present disclosure, the fingerprint sensor 110 may be mounted on various positions of the electronic device 100. For example, the fingerprint sensor 110 may be provided in a form of being mounted at a key or a button. For example, the fingerprint sensor 110 may be mounted at a home key. Alternatively, the fingerprint sensor 110 may be provided in a form of being mounted at a display panel or a touch panel. Alternatively, the fingerprint sensor 110 is mounted on a display panel to be a display integrated type. The fingerprint sensor 110 may be various positions such as the front, side, or rear of the electronic device 100 in addition to the above-mentioned positions.

The processor 120 may determine whether the fingerprint of sensing data is a registered fingerprint through fingerprint authentication processing. For example, the processor 120 may determine whether an obtained fingerprint image is identical to a registered fingerprint image by comparing the registered fingerprint image with the fingerprint obtained through fingerprint sensing. Alternatively, the processor 120 may determine whether the fingerprint of sensing data is a registered fingerprint by using the minutia extracted from a fingerprint image. In addition to this, the processor 120 may perform fingerprint authentication processing by using various fingerprint authentication methods.

According to various embodiments of the present disclosure, the processor 120 may receive a trigger signal and control an operation of the fingerprint sensor 110 in response to the trigger signal or control an operation of a module (for example, the communication interface 140) that undergoes an interference caused from an operating frequency of the fingerprint sensor 110.

According to various embodiments of the present disclosure, the processor 120 may control operations of the fingerprint sensor 110 through various methods. For example, the processor 120 may change at least one of an operating frequency, an operating power, an operating current, and a circuit path of the fingerprint sensor 110.

According to various embodiments of the present disclosure, the processor 120 may control operations of a module (for example, the communication interface 140) that undergoes an interference caused from an operating frequency of the fingerprint sensor 110. For example, the processor 120 may change at least one of an operating frequency, an operating power, an operating current, and a circuit path of a module that undergoes an interference caused from an operating frequency of the fingerprint sensor 110. For example, the processor 120 may determine a transmission antenna based on the reception signal characteristics of each of a plurality of antennas and may perform antenna switching to the determined transmission antenna. Alternatively, the processor 120 may determine the transmission timing of data in the communication interface 140 and may perform data transmission according to the determined transmission timing.

According to an embodiment of the present disclosure, when the communication interface 140 interferes with an operation of the fingerprint sensor 110 while performing data communication (for example, a data transmission/reception operation), the processor 120 may increase an operating power of the communication interface 140 in order to reduce the influence of an interference caused by the fingerprint sensor 110. Alternatively, by lowering an operating current of the communication interface 140 or raising an operating current of the fingerprint sensor 110, the processor 120 may reduce the influence of an interference by the communication interface 140 and thus, may increase the fingerprint recognition rate of the fingerprint sensor 110.

According to an embodiment of the present disclosure, when the electronic device 100 interferes with an operation of the fingerprint sensor 110 while performing charging, the processor 120 may increase an operating current of the fingerprint sensor 110 in order to increase the fingerprint recognition rate of the fingerprint sensor 110. For example, the processor 120 may increase an operating current of the fingerprint sensor 110 while charging the electronic device 100. Alternatively, the processor 120 may increase an operating current of the fingerprint sensor 110 while performing the fingerprint recognition of the fingerprint sensor 110, and then, when the fingerprint recognition of the fingerprint sensor 110 is completed, may return the operating current to the previous operating current again.

According to an embodiment of the present disclosure, if fingerprint sensing for fingerprint authentication is detected while the electronic device 100 plays a video, the processor 110 may reduce the frames of the video being played currently or change at least one of an operating frequency, an operating power, and an operating current of the fingerprint sensor 110 in order to increase the recognition rate of the fingerprint sensor 110. When the fingerprint recognition of the fingerprint sensor 110 is completed, the processor 120 may return to a previous state again (for example, a video frame before change, an operating frequency before change, an operating power before change, or an operating current before change).

According to an embodiment of the present disclosure, depending on a state of the electronic device 100 or an application in execution, the processor 120 may select a unit to ensure the performance first from the fingerprint sensor 110 and a module that undergoes an interference caused from an operating frequency of the fingerprint sensor 110. For example, while the electronic device 100 is in a lock screen state or processes security data, in order to enhance the fingerprint recognition rate of the fingerprint sensor 110 (for example, ensure the performance of the fingerprint sensor 110), the electronic device 100 may increase at least one of an operating frequency, an operating power, and an operating current of the fingerprint sensor 110. Alternatively, when the electronic device 100 performs a fingerprint authentication process through another electronic device (for example, a wearable device) functionally connected to the electronic device 1100, in order to guarantee the data transmission/reception performance of the antenna or the communication module 200, the electronic device 100 may increase at least one of an operating frequency, an operating poser, and an operating current of the antenna or the communication module 200 instead of the fingerprint sensor 110. According to various embodiments of the present disclosure, the processor 120 may be configured with at least one processor.

The touch panel 130 may detect a touch variation amount or a hover touch variation amount. The touch panel 130 may detect a touch input on a screen based on the detected touch variation amount or the detected hover touch variation amount. For example, when the touch panel 130 detects a touch input by using a change in capacitance, a touch variation amount or a hover touch variation amount may be a variation amount in capacitance. According to various embodiments of the present disclosure, the touch panel 130 may include a plurality of functionally-divided touch panels.

The touch panel 130 may detect a touch input signals through sensors provided at the surface of the touch panel 130 by converting a state change of sensors, for example, a pressure change applied to the surface, a change in capacitance, a change in light amount, into electrical. The touch panel 130 may be implemented through various methods such as resistive, capacitive, ultrasonic, and infrared methods.

The communication interface 140 may transmit/receive data to/from an external device (not shown) through a network. The communication interface 140 may include at least one of an antenna, a communication module, a cellular module, a Wi-Fi module, a GPS module, a Bluetooth module, a radio frequency (RF) module, and a near field communication (NFC) module. A specific description relating to the communication interface 140 may refer to FIG. 2.

Before the fingerprint sensor 110 is driven or while the fingerprint sensor 110 is driven, by changing an operation of the fingerprint sensor 110 or changing an operation of a module that undergoes an interference caused from an operating frequency of the fingerprint sensor 110, the electronic device 100 may reduce an interference caused from the harmonics of an operating frequency of the fingerprint sensor 110. Alternatively, when the fingerprint recognition of the fingerprint sensor 110 is failed, the electronic device 110 may change an operation of the fingerprint sensor 110 or change an operation of a module that undergoes an interference caused from an operating frequency of the fingerprint sensor 110. Accordingly, the electronic device 100 may prevent the deterioration of antenna radiation performance due to an operating frequency of the fingerprint sensor 110. Additionally, since an interference between the fingerprint sensor 110 and an antenna is prevented, the recognition rate of the fingerprint sensor 110 may be improved.

FIG. 2 is a block diagram of a communication interface according to various embodiments of the present disclosure.

Referring to FIG. 2, a communication interface 140 may include a communication module 200, a first antenna ANT1 251, and a second antenna ANT 252. The communication module 200 may include at least one of a transmission control module 210, a monitoring module 220, an antenna switching module 230, a first coupler 241, and a second coupler 242.

Although two antennas such as the first antenna 251 and the second antenna 252 are shown in FIG. 2, the present disclosure is not limited thereto and the communication interface 140 may include a plurality of antennas. Additionally, like the first coupler 241 connected to the first antenna 251 and the second coupler 242 connected to the second antenna, the communication interface 140 may include couplers respectively corresponding to a plurality of antennas.

In order to prevent the performance deterioration due to the harmonics of an operating frequency in the fingerprint sensor 110, the electronic device 100 may drive the fingerprint sensor 110 after changing an operation of the communication interface 140. For example, the communication module 200 may change a transmission power, perform antenna switching, or perform data transmission in response to a control signal of the processor 120.

The transmission control module 210 may control a transmission power of the communication module 200 in response to a control signal of the processor 120. If the transmission power of the communication module 200 is changed by the transmission control module 210, the fingerprint sensor 110 may be driven. For example, even if the harmonics of an operating frequency of the fingerprint sensor 110 interferes with signals transmitted from the communication module 200, the deterioration of the antenna radiation performance may be prevented through a change of the transmission power. For example, when detecting an interference between the fingerprint sensor 110 and the communication module 200, the processor 120 may prevent the deterioration of antenna radiation performance by increasing an operating power of the communication module 220.

The transmission control module 210 may perform data transmission in response to a control signal of the processor 120. For example, the transmission control module 210 may perform data transmission according to a transmission timing determined by the processor 120. If a transmission timing of data transmitted from the communication module 200 is changed by the transmission control module 210, the fingerprint sensor 110 may be driven. For example, when the trigger signal is received, the processor 120 may determine to stop the transmission of data in the communication module 200 and when the driving of the fingerprint sensor 110 is terminated, may determine to resume the transmission of the data. Accordingly, if the data transmission is stopped in the communication module 200, the fingerprint sensor 110 may be driven.

Alternatively, when data is transmitted/received during the driving of the fingerprint sensor 110, the processor 120 may increase an operating power of the communication module 200 or perform antenna switching in order to execute data transmission/reception first in the communication module 200.

The monitoring module 220 may monitor the reception signal characteristics of each of a plurality of antennas (for example, the first antenna 251 and the second antenna 252) provided in the electronic device 100. For example, the reception signal characteristics may be received signal strength indication (RSSI).

The antenna switching module 230 may perform antenna switching in response to a control signal of the processor 120. The processor 120 may determine a transmission antenna based on the reception signal characteristics of each of a plurality of antennas. For example, the processor 120 may determine an antenna having the smallest sensitivity change among the plurality of antennas as a transmission antenna based on the reception signal characteristics of each of the plurality of antennas. The antenna switching module 230 may perform antenna switching to the determined transmission antenna.

Each of the first coupler 241 and the second coupler 242 may extract some signals received or transmitted through the first antenna 251 or the second antenna 242 and may transmit the extracted signals to the monitoring module 220. The first antenna 251 and the second antenna 252 may transmit signals to an external device (not shown) or receive signals transmitted from an external device (not shown).

According to various embodiments of the present disclosure, an electronic device may include a wireless communication module for performing wireless communication in a first state, a fingerprint sensor for sensing a fingerprint in a second state, and at least one processor electrically connected to the wireless communication module and the fingerprint sensor.

According to various embodiments of the present disclosure, based on at least part of the first state of the wireless communication module or the second state of the fingerprint sensor, the processor may change the first state or the second state.

According to various embodiments of the present disclosure, the first state may include at least one of a state in which the wireless communication module operates at a first operating frequency, a state in which the wireless communication module operates with a first operating power, and a state in which the wireless communication module operates as a first circuit path, and the second state may include at least one of a state in which the fingerprint sensor operates at a second operating frequency, a state in which the fingerprint sensor operates with a second operating power, and a state in which the fingerprint sensor operates as a second circuit path.

According to various embodiments of the present disclosure, the processor receives a first signal for notifying an operation of the fingerprint sensor, and in response to the reception of the first signal, the processor may change the operating frequency of the wireless communication module in the first state or change the operating frequency of the fingerprint sensor.

According to various embodiments of the present disclosure, the processor may receive a first signal for notifying an operation of the fingerprint sensor and in response to the first signal, may change a transmission power of the wireless communication module.

According to various embodiments of the present disclosure, the electronic device includes a plurality of antennas. The wireless communication module may monitor the reception signal characteristics of each of the plurality of antennas and perform antenna switching in response to a control signal of the processor, and the processor may receive a first signal for notifying an operation of the fingerprint sensor and in response to the first signal, may change a transmission antenna based on the reception signal characteristics of each of the plurality of antennas.

According to various embodiments of the present disclosure, the processor may determine an antenna having the smallest sensitivity change among the plurality of antennas as a transmission antenna based on the reception signal characteristics of each of the plurality of antennas.

According to various embodiments of the present disclosure, the processor may receive a first signal for notifying an operation of the fingerprint sensor and in response to the first signal, may change a transmission timing of data in the wireless communication module.

According to various embodiments of the present disclosure, when the first signal is received, the processor may determine to stop the transmission of data in the wireless communication module and when the driving of the fingerprint sensor 110 is terminated, may control the wireless communication module to resume the transmission of the data.

According to various embodiments of the present disclosure, the electronic device may include a touch panel for detecting a touch variation amount or a hover touch variation amount and may generate the first signal by detecting the intention of fingerprint sensing based on a detected touch variation amount or hover touch variation amount.

According to various embodiments of the present disclosure, the processor may generate the first signal according to an event performed at the electronic device, a screen state of the electronic device, or the type of an application executed on the electronic device.

According to various embodiments of the present disclosure, the wireless communication module may include at least one of an antenna, a communication module, a cellular module, a Wi-Fi module, a GPS module, a Bluetooth module, an RF module, and an NFC module.

FIG. 3 is a block diagram of a fingerprint sensor in an electronic device according to various embodiments of the present disclosure. According to this embodiment, an electronic device 300 may include a fingerprint sensor 110 at the center of the lower end of the electronic device 300. The electronic device 300 may include at least one of a first touch panel 131 that is integrated with a display over the front, a second touch panel 132 disposed at the left of the lower end, a third touch panel 133 integrated with the fingerprint sensor 110, and a fourth touch panel 134 disposed at the right of the lower end. The electronic device 300 may include a first antenna 251 at the upper part and a second antenna 252 at the lower part.

For example, when the fingerprint sensor 110 is a swipe-type fingerprint sensor, the electronic device 300 may detect a touch variation amount of the first touch panel 131, the second touch panel 132, the third touch panel 133, or the fourth touch panel 134 according to a swipe direction and may detect the intention of fingerprint sensing based on the touch variation amount.

Alternatively, when the fingerprint sensor 110 is a touch-type fingerprint sensor, the electronic device 300 may detect a hover touch variation amount of the third touch panel 133 and may detect the intention of fingerprint sensing based on the hover touch variation amount. Alternatively, the electronic device 300 may detect the intention of fingerprint sensing by using a proximity sensor amounted at the third touch panel 133. Besides that, the electronic device 300 may detect the intention of fingerprint sensing through various methods.

According to this embodiment, when the intention of fingerprint sensing is detected by the electronic device 300, a trigger signal may be generated. Alternatively, if a specified application is executed or a specified operation is performed in the electronic device 300, for example, when a display changes from an off state into an on state, a trigger signal may be generated.

According to this embodiment, in response to a trigger signal, before driving the fingerprint sensor 110, in order to reduce the influence of an interference caused from an operating frequency of the fingerprint sensor 110, the electronic device 300 may change an operating frequency of the fingerprint sensor, a transmission power of a communication module, change a timing of data transmission of a communication module, or perform antenna switching.

FIG. 4 is a flowchart illustrating a method of changing and driving an operation of a fingerprint sensor or an operation of a module that undergoes an interference according to various embodiments of the present disclosure.

Referring to FIG. 4, a method for driving a fingerprint sensor shown in FIG. 4 is configured with operations processed in the electronic device 100 shown in FIG. 1. Accordingly, although some contents are omitted in this embodiment of the present disclosure, the above described contents relating to the electronic device 100 of FIG. 1 are applied to the method shown in FIG. 4.

In operation 410, the electronic device 100 may receive a trigger signal. The trigger signal may be generated by an event performed in the electronic device 100 or according to a screen state or the electronic device 100 or the execution of an application. For example, by an event that the touch panel 130 changes from an off state into an on state, a trigger signal may be generated. Alternatively, when a specified application (for example, an application using the fingerprint sensor 110) is executed, a trigger signal may be generated. For example, an application using the fingerprint sensor 110 may include a security authentication application, a payment application, or an application relating to the user's privacy. Alternatively, when a specified screen state is obtained, a trigger signal may be generated. For example, the processor 120 may determine that it is a screen state for fingerprint authentication and generate a trigger signal in order to change at least one of an operating frequency, an operating power, a circuit path, or an operating current of the fingerprint sensor 110.

Alternatively, when the intention of finger sensing (for example, a pre-movement) is detected based on a touch variation amount or hover touch variation amount of the touch panel 130 or sensing data of a proximity sensor, a trigger signal may be generated. For example, when a user provides a fingerprint to the fingerprint sensor 110 provided in the electronic device 100, a touch variation amount of more than a reference value may be detected in an area of the touch panel 130 adjacent to the fingerprint sensor 110. The touch panel 130 may detect the intention of fingerprint sensing based on a touch variation amount in an area of the touch panel 130 adjacent to the fingerprint sensor 110 and may generate the trigger signal. For example, depending on whether the fingerprint sensor 110 is a swipe type or a touch type, an area of the touch panel 130, where a reference value of a touch variation amount or a hover touch variation amount, a touch variation amount, or a hover touch variation amount is detected, may vary.

In addition to the above-listed modules, the trigger signal may be generated by various events performed in the electronic device 100.

In operation 420, the electronic device 100 may change an operating frequency of the fingerprint sensor 110 or an operation of a module (for example, the communication interface 140) that undergoes an interference caused from an operating frequency of the fingerprint sensor 110.

In operation 430, the electronic device 100 may drive the fingerprint sensor 110.

FIG. 5 is a flowchart illustrating a method of changing and driving a driving frequency of a fingerprint sensor according to various embodiments of the present disclosure.

The method of driving and changing a driving frequency of a fingerprint sensor shown in FIG. 5 is configured with operations processed in the electronic device 100 of FIG. 1. Accordingly, although some contents are omitted in this embodiment of the present disclosure, the above described contents relating to the electronic device 100 of FIG. 1 are applied to the method shown in FIG. 5.

In operation 510, the electronic device 100 may receive a trigger signal.

In operation 520, the electronic device 100 may change an operating frequency of the fingerprint sensor 110. For example, the electronic device 100 may determine at least one of a plurality of frequencies at which the fingerprint sensor 110 is driven as an operating frequency. The processor 120 may determine, as an operating frequency, a frequency that does not cause an interference with a frequency of a transmission channel or a reception channel of an RF module among the plurality of frequencies based on a frequency of a transmission channel or a reception channel of an RF module. For example, when a reception band is 850 MHz to 880 MHz in an RF module, the processor 120 may determine, as an operating frequency, 70 MHz at which the harmonics of a corresponding frequency among a plurality of frequencies of the fingerprint sensor 110 do not interfere with a frequency in a reception band of the RF module. The electronic device 100 may change an operating frequency of the fingerprint sensor 110 into the determined operating frequency.

In operation 530, the electronic device 100 may drive the fingerprint sensor 110 at the changed operating frequency.

FIG. 6 is a flowchart illustrating a method of changing and driving a transmission power of a communication module according to various embodiments of the present disclosure.

Referring to FIG. 6, the method for driving a fingerprint sensor shown in FIG. 6 is configured with operations processed in the electronic device 100 shown in FIG. 1. Accordingly, although some contents are omitted in this embodiment of the present disclosure, the above described contents relating to the electronic device 100 of FIG. 1 are applied to the method shown in FIG. 6.

In operation 610, the electronic device 100 may receive a trigger signal.

In operation 620, the electronic device 100 may change a transmission power of the communication module 200 that undergoes an interference caused from an operating frequency of the fingerprint sensor 110. For example, the electronic device 100 may determine a transmission power of the communication module 200 that undergoes an interference caused from an operating frequency of the fingerprint sensor 110. For example, even if the communication module 200 undergoes an interference caused from an operating frequency of the fingerprint sensor 110, the processor 120 may determine a transmission power of the communication module 200 as a transmission power that is high enough not to affect the performance of data transmission. The electronic device 100 may perform data transmission with the determined transmission power.

In operation 630, the electronic device 100 may drive the fingerprint sensor 110 after the transmission power of the communication module 200 is changed.

FIG. 7 is a flowchart illustrating a method of driving a fingerprint sensor by performing antenna switching according to various embodiments of the present disclosure.

Referring to FIG. 7, the method for driving a fingerprint sensor shown in FIG. 8 is configured with operations processed in the electronic device 100 shown in FIG. 1. Accordingly, although some contents are omitted in this embodiment of the present disclosure, the above described contents relating to the electronic device 100 of FIG. 1 are applied to the method shown in FIG. 7.

In operation 710, the electronic device 100 may receive a trigger signal.

In operation 720, the electronic device 100 may receive the reception signal characteristics of each of a plurality of antennas.

In operation 730, the electronic device 100 may determine a transmission antenna based on the reception signal characteristics of each of a plurality of antennas. For example, the electronic device 100 may determine an antenna having the smallest sensitivity change among the plurality of antennas as a transmission antenna based on the reception signal characteristics of each of the plurality of antennas.

In operation 740, the electronic device 100 may perform antenna switching with the determined transmission antenna.

In operation 750, after performing the antenna switching, the electronic device 100 may drive the fingerprint sensor 110.

FIG. 8 is a flowchart illustrating a method of changing a transmission timing of data and driving a fingerprint sensor according to various embodiments of the present disclosure.

Referring to FIG. 8, the method for driving a fingerprint sensor shown in FIG. 8 is configured with operations processed in the electronic device 100 shown in FIG. 1. Accordingly, although some contents are omitted in this embodiment of the present disclosure, the above described contents relating to the electronic device 100 of FIG. 1 are applied to the method shown in FIG. 8.

In operation 810, the electronic device 100 may receive a trigger signal.

In operation 820, the electronic device 100 may determine a data transmission timing in the communication module 200.

In operation 830, the electronic device 100 may transmit data according to the determined transmission timing.

In operation 840, after the transmission timing is changed, the electronic device 100 may drive the fingerprint sensor 110.

For example, when the trigger signal is received, the electronic device 100 may stop the transmission of data in the communication module 200 and may drive the fingerprint sensor 110 and when the driving of the fingerprint sensor 110 is terminated, the electronic device 100 may resume the transmission of the data.

According to various embodiments of the present disclosure, a method of driving a fingerprint sensor in an electronic device may include performing wireless communication through a wireless communication module functionally connected to the electronic device in a first state; sensing a fingerprint through a fingerprint sensor functionally connected to the electronic device in a second state; and changing the first state or the second state based on at least part of an operating state of the wireless communication module or the fingerprint sensor through a processor functionally connected to the electronic device.

According to various embodiments of the present disclosure, each of the first state and the second state includes at least one of an operating frequency, an operating power, and a circuit path.

According to various embodiments of the present disclosure, the method further includes receiving a first signal for notifying an operation of the fingerprint sensor, wherein the changing of the first state or the second state includes changing the first state or the second state after the receiving of the first signal.

According to various embodiments of the present disclosure, the changing of the first state or the second state includes changing a transmission power of the wireless communication module in correspondence to the first signal; and driving the fingerprint sensor when the transmission power of the wireless communication module is changed.

According to various embodiments of the present disclosure, the changing of the first state or the second state includes: receiving reception signal characteristics of each of a plurality of antenna of the electronic device; performing antenna switching to a transmission antenna determined based on the reception signal characteristics of each of the plurality of antennas, in response to the first signal; and driving the fingerprint sensor when the antenna switching is performed.

According to various embodiments of the present disclosure, the changing of the first state or the second state includes: transmitting data according to a transmission timing of data determined based on at least part of an operating state of the wireless communication module or the fingerprint sensor in correspondence to the first signal; and driving the fingerprint sensor when the transmission timing is adjusted.

According to various embodiments of the present disclosure, the transmitting of the data includes, when the first signal is received, stopping the transmission of the data in the wireless communication module and when the driving of the fingerprint sensor is terminated, resuming the transmission of the data; and the driving of the fingerprint sensor includes driving the fingerprint sensor when the transmission of the data is stopped in the communication module.

According to various embodiments of the present disclosure, the method includes detecting a touch variation amount or a hover touch variation amount of a touch panel of the electronic device; and generating the first signal by detecting an intention of fingerprint sensing based on a touch variation amount or a hover touch variation amount.

According to various embodiments of the present disclosure, the method includes generating the first signal according to an event performed at the electronic device, a screen state of the electronic device, or a type of an application executed on the electronic device.

FIG. 9 is a block diagram of an electronic device including a fingerprint sensor according to various embodiments of the present disclosure.

Referring to FIG. 9, the electronic device 900 may include a bus 910, a processor 920, a memory 930, an input/output interface 940, a display 950, a communication interface 960, and a fingerprint sensor 970.

The bus 910 may be a circuit connecting the above-mentioned components to each other and delivering a communication (for example, a control message) between the above-mentioned components. According to various embodiments of the present disclosure, the bus 910 may connect between the processor 920 and the fingerprint sensor 970 and/or between the above-mentioned components (for example, the memory 930, the input/output interface 940, the display 950, the communication interface 960, and the fingerprint sensor 970) to deliver communication thereto.

The processor 920, for example, may receive instructions from the above-mentioned other components (for example, the memory 930, the input/output interface 940, the display 950, the communication interface 960, and the fingerprint sensor 970) through the bus 910, interpret the received instructions, and execute calculation or data processing according to the interpreted instructions. According to various embodiments of the present disclosure, the processor 120 may correspond to the processor 120 shown in FIG. 1.

The memory 930 may store instructions or data received or generated from the processor 920 or other components (for example, the input/output interface 940, the display 950, the communication interface 960, and the fingerprint sensor 970).

The memory 930, as a typical storage medium, may store data or program necessary for the processor 920 to control an operating frequency of the fingerprint sensor 110. Additionally, the memory 930 may store data or program necessary for the processor 920 to control operations of a module or the communication interface 960, which undergoes an interference caused from an operating frequency of the fingerprint sensor 110.

The memory 930 may store program routines or instruction sets necessary for the processor 920 to control the input/output interface 940, the communication interface 960, or the fingerprint sensor 970.

The memory 930 may store data or programs necessary for an operation of the electronic device 900. For example, the memory 930 may include Hard Disk Drive (HDD), Read Only Memory (ROM), Random Access Memory (RAM), Flash Memory, Memory Card, NAND memory, or Solid State Drive (SDD).

The memory 930, for example, may include programming modules such as a kernel 931, a middleware 932, an application programming interface (API) 933, or an application 934. Each of the above-mentioned programming modules may be configured with software, firmware, hardware, or a combination of at least two thereof. The kernel 931 may control or manage system resources (for example, the bus 910, the processor 920, or the memory 930) used for executing operations or functions implemented in the remaining other programming modules, for example, the middleware 932, the API 933, or the application 934 or used for calling stored data. Additionally, the kernel 931 may provide an interface for performing a controlling or managing operation by accessing an individual component of the electronic device 900 from the middleware 932, the API 933, or the application 934.

The middleware 932 may serve as an intermediary role for exchanging data as the API 933 or the application 934 communicates with the kernel 231. Additionally, in relation to job requests received from the application 934, the middleware 932, for example, may perform a control (for example, scheduling or load balancing) for the job requests by using a method of assigning a priority for using a system resource (for example, the bus 910, the processor 920, the fingerprint sensor 970, the memory 930, and so on) of the electronic device 900 to at least one application among the applications 934.

The API 933, as an interface for allowing the application 934 to control a function provided from the kernel 931 or the middleware 932, may include at least one interface or function (for example, an instruction) for file control, window control, image processing, or character control.

According to various embodiments of the present disclosure, the application 934 may include SMS/MMS applications, e-mail applications, calendar applications, notification applications, health care applications (for example, applications for measuring exercise amount or blood glucose), environmental information applications (for example, applications for providing pressure, humidity, or temperature information), a camera application, an OCR application, an image editing application, a call message application, a memo pad application, an internet application, and so on.

Additionally or alternatively, the application 934 may be an application relating to information exchange between the electronic device 900 and an external electronic device (for example, the electronic device 902 or the server 904). The information exchange related application, for example, may include a notification relay application for relaying specific information to the external device or a device management application for managing the external electronic device.

For example, the notification relay application may have a function for relaying to, an external electronic device (for example, the electronic device 902 or the server 904), notification information occurring from another application (for example, an SMS/MMS application, an e-mail application, a health care application, or an environmental information providing application) of the electronic device 900. Additionally or alternatively, the notification relay application may receive notification information from an external electronic device (for example, the electronic device 902 or the server 904) and may then provide the received notification information to a user. The device management application, for example, may manage (for example, install, delete, or update) at least part of a function (turn-on/turn off of the external electronic device itself (or some components) or the brightness (or resolution) adjustment of a display) of an external electronic device (for example, the electronic device 902 of the server 904) communicating with the electronic device 900, an application operating in the external electronic device, or a service (for example, call service or message service) provided from the external device.

According to various embodiments of the present disclosure, the application 934 may include a specified application according to the property (for example, the type of an electronic device) of the external device (for example, the electronic device 902 or the server 904). For example, when an external electronic device is an MP3 player, the application 934 may include an application relating to music playback. Similarly, when an external electronic device is a mobile medical device, the application 934 may include an application relating to heath care. According to an embodiment of the present disclosure, the application 934 may include at least one of an application assigned to the electronic device 900 and an application received from an external device (for example, the electronic device 902 or the server 904).

The input/output interface 940 may deliver an instruction or data inputted from a user through an input/output device (for example, a sensor, a keyboard, or a touch screen) to the processor 920, the memory 930, the communication interface 960, or the fingerprint sensor 970 through the bus 910. For example, the input/output interface 940 may provide to the processor 920 data on a user's touch inputted through a touch screen. Additionally, the input/output interface 940 may output, through the input/output device (for example, a speaker or a display), instructions or data received from the CPU 920, the memory 930, the communication interface 960, or the fingerprint sensor 970 through the bus 910. For example, the input/output interface 940 may output voice data processed through the processor 920 to a user through a speaker.

The input/output interface 940 may include an input device such as a touch screen, a liquid crystal display, a thin film transistor-liquid crystal display, an organic light-emitting diode, a flexible display, a 3D display, a touch screen, and a speaker and a software module for driving it.

The display 950 may display various information (for example, multimedia data or text data) to a user.

The communication interface 960 may connect a communication between the electronic device 900 and an external device (for example, the electronic device 902 or the server device 904). For example, the communication interface 960 may communicate with the external device in connection to the network 962 through wireless communication or wired communication. The wireless communication, for example, may include at least one of wireless fidelity (WiFi), Bluetooth (BT), near field communication (NFC), global positioning system (GPS), and cellular communication (for example, LTE, LTE-A, CDMA, WCDMA, UMTS, WiBro, or GSM). The wired communication, for example, may include at least one of universal serial bus (USB), high definition multimedia interface (HDMI), recommended standard 232 (RS-232), and plain old telephone service (POTS), for example.

According to various embodiments of the present disclosure, the communication interface 960 may receive data from an external device such as the electronic device 902 or the server 904. Alternatively, the communication interface 960 may transmit data to an external device such as the electronic device 902 or the server 904.

According to an embodiment of the present disclosure, the network 962 may be telecommunications network. The telecommunications network may include at least one of computer network, internet, internet of things (IoT), and telephone network. According to an embodiment of the present disclosure, a protocol (for example, transport layer protocol, data link layer protocol, or physical layer protocol) for communication between the electronic device 900 and an external device may be supported by at least one of the application 934, the application programming interface 933, the middleware 932, the kernel 931, the communication interface 960, and the fingerprint sensor 970.

The fingerprint sensor 970 may be driven according to a control signal of the processor 920. For example, when the processor 920 changes an operating frequency of the fingerprint sensor 970 or an operation of a module (for example, the communication interface 960) that undergoes an interference caused from the operating frequency of the fingerprint sensor 970, the fingerprint sensor 970 may be driven.

An external device (for example, the electronic device 902 or the server 904) may receive data from the electronic device 900. Alternatively, an external device (for example, the electronic device 902 or the server 904) may transmit data to the electronic device 900.

For example, the electronic device 902 or the server 904) may include all electronic devices communicable with the electronic device 900, for example, a mobile phone, a smartphone, a notebook computer, a digital broadcast terminal, a digital camera, a portable game terminal, a Personal Digital Assistant (PDA), a Portable Multimedia Player (PMP), a navigation, or a tablet PC.

FIG. 10 is a block diagram of an electronic device according to various embodiments of the present disclosure.

The electronic device 1001, for example, may configure all or part of the above-mentioned electronic device 100 shown in FIG. 1. Referring to FIG. 10, the electronic device 1001 may include application processor (AP) 1010, a low power processor 1012, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may control a plurality of hardware or software components connected to the AP 1010 and also may perform various data processing and operations with multimedia data by executing an operating system or an application program. The AP 1010 may be implemented with a system on chip (SoC), for example. According to an embodiment of the present disclosure, the AP 1010 may further include a graphic processing unit (GPU) (not shown).

The communication module 1020 may perform data transmission/reception between the electronic device 1001 and other electronic devices connected via network. According to an embodiment of the present disclosure, the communication module 1020 may include a cellular module 1021, a WiFi module 1023, a BT module 1025, a GPS module 1027, an NFC module 1028, and a radio frequency (RF) module 1029.

The cellular module 1021 may provide voice calls, video calls, text services, or internet services through a communication network (for example, LTE, LTE-A, CDMA, WCDMA, UMTS, WiBro, or GSM). Additionally, the cellular module 1021 may perform a distinction and authentication operation on an electronic device in a communication network by using a subscriber identification module (for example, the SIM card 1024), for example. According to an embodiment of the present disclosure, the cellular module 1021 may perform at least part of a function that the AP 1010 provides. For example, the cellular module 1021 may perform at least part of a multimedia control function.

According to an embodiment of the present disclosure, the cellular module 1021 may further include a communication processor (CP). Additionally, the cellular module 1021 may be implemented with SoC, for example. As shown in FIG. 8, components such as the cellular module 1021 (for example, a CP), the memory 1030, or the power management module 1095 are separated from the AP 1010, but according to an embodiment of the present disclosure, the AP 1010 may be implemented including some of the above-mentioned components (for example, the cellular module 1021).

According to an embodiment of the present disclosure, the AP 1010 or the cellular module 1021 (for example, a CP) may load instructions or data, which are received from a nonvolatile memory or at least one of other components connected thereto, into a volatile memory and then may process them. Furthermore, the AP 1010 or the cellular module 1021 may store data received from or generated by at least one of other components in a nonvolatile memory.

Each of the WiFi module 1023, the BT module 1025, the GPS module 1027, and the NFC module 1028 may include a processor for processing data transmitted/received through a corresponding module. Although the cellular module 1021, the WiFi module 1023, the BT module 1025, the GPS module 1027, and the NFC module 1028 are shown as separate blocks in FIG. 10, according to an embodiment of the present disclosure, some (for example, at least two) of the cellular module 1021, the WiFi module 1023, the BT module 1025, the GPS module 1027, and the NFC module 1028 may be included in one integrated chip (IC) or an IC package. For example, at least some (for example, a CP corresponding to the cellular module 1021 and a WiFi processor corresponding to the WiFi module 1023) of processors respectively corresponding to the cellular module 1021, the WiFi module 1023, the BT module 1025, the GPS module 1027, and the NFC module 1028 may be implemented with one SoC.

The RF module 1029 may be responsible for data transmission/reception, for example, the transmission/reception of an RF signal. Although not shown in the drawings, the RF module 1029 may include a transceiver, a power amp module (PAM), a frequency filter, or a low noise amplifier (LNA). Additionally, the RF module 1029 may further include components for transmitting/receiving electromagnetic waves on a free space in a wireless communication, for example, conductors or conducting wires. Although the cellular module 1021, the WiFi module 1023, the BT module 1025, the GPS module 1027, and the NFC module 1028 share one RF module 1029 shown in FIG. 10, according to an embodiment of the present disclosure, at least one of the cellular module 1021, the WiFi module 1023, the BT module 1025, the GPS module 1027, and the NFC module 1028 may perform the transmission of an RF signal through an additional RF module.

The SIM card 1024 may be a card including a subscriber identification module and may be inserted into a slot formed at a specific position of an electronic device. The SIM card 1024 may include unique identification information (for example, an integrated circuit card identifier (ICCID)) or subscriber information (for example, an international mobile subscriber identity (IMSI)).

The memory 1030 may include an internal memory 1032 or an external memory 1034. The internal memory 1032 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present invention, the internal memory 1032 may be a Solid State Drive (SSD). The external memory 1034 may further include flash drive, for example, compact flash (CF), secure digital (SD), micro Micro-SD, Mini-SD, extreme digital (xD), or a memory-stick. The external memory 1034 may be functionally connected to the electronic device 1001 through various interfaces. According to an embodiment of the present invention, the electronic device 1001 may further include a storage device (or a storage medium) such as a hard drive.

The sensor module 1040 measures physical quantities or detects an operating state of the electronic device 1001, thereby converting the measured or detected information into electrical signals. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (for example, a red, green, blue (RGB) sensor), a biometric sensor 1040I, a temperature/humidity sensor 1040J, an illumination sensor 1040K, and an ultra violet (UV) sensor 1040M. Additionally or alternatively, the sensor module 1040 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 1040K may further include a control circuit for controlling at least one sensor therein.

The input device 1050 may include a touch panel 1052, a (digital) pen sensor 1054, a key 1056, or an ultrasonic input device 1058. The touch panel 1052 may recognize a touch input through at least one of capacitive, resistive, infrared, or ultrasonic methods, for example. Additionally, the touch panel 1052 may further include a control circuit. In the case of the capacitive method, both direct touch and proximity recognition are possible. The touch panel 1052 may further include a tactile layer. In this case, the touch panel 1052 may provide a tactile response to a user.

The (digital) pen sensor 1054 may be implemented through a method similar or identical to that of receiving a user's touch input or an additional sheet for recognition. The key 1056 may include a physical button, an optical key, or a keypad, for example. The ultrasonic input device 1058, as a device checking data by detecting sound waves through a microphone (for example, a microphone 1088) in the electronic device 1001, may provide wireless recognition through an input tool generating ultrasonic signals. According to an embodiment of the present disclosure, the electronic device 1001 may receive a user input from an external device (for example, a computer or a server) connected to the electronic device 1001 through the communication module 1020.

The display module 1060 may include a display driving module 1062, a panel 1064, a hologram device 1066, or a projector 1068. According to an embodiment of the present disclosure, the display driving module 1062 may further include a control circuit for controlling the panel 1064, the hologram device 1066, or the projector 1068. The panel 1064 may include a liquid-crystal display (LCD) or an active-matrix organic light-emitting diode (AM-OLED). The panel 1064 may be implemented to be flexible, transparent, or wearable, for example. The panel 1064 and the touch panel 1052 may be configured with one module. The hologram 1066 may show three-dimensional images in the air by using the interference of light. The projector 1068 may display an image by projecting light on a screen. The screen, for example, may be placed inside or outside the electronic device 1001.

The interface 1070 may include a high-definition multimedia interface (HDMI) 1072, a universal serial bus (USB) 1074, an optical interface 1076, or a D-subminiature (sub) 1078, for example. Additionally or alternatively, the interface 1070 may include a mobile high-definition link (MHL) interface, a secure Digital (SD) card/multi-media card (MMC) interface, or an infrared data association (IrDA) standard interface.

The audio module 1080 may convert sound into electrical signals and convert electrical signals into sounds. The audio module 1080 may process sound information inputted/outputted through a speaker 1082, a receiver 1084, an earphone 1086, or a microphone 1088.

The camera module 1091, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1095 may manage the power of the electronic device 1001. Although not shown in the drawings, the power management module 1095 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 1096, or a voltage, current, or temperature of the battery 1096 during charging. The battery 1096 may store or generate electricity and may supply power to the electronic device 1001 by using the stored or generated electricity. The battery 1096, for example, may include a rechargeable battery or a solar battery.

The indicator 1097 may display a specific state of the electronic device 1001 or part thereof (for example, the AP 1010), for example, a booting state, a message state, or a charging state. The indicator 1097 may include an LED. The motor 1098 may convert electrical signals into mechanical vibration. Although not shown in the drawings, the electronic device 1001 may include a processing device (for example, a GPU) for mobile TV support. A processing device for mobile TV support may process media data according to the standards such as digital multimedia broadcasting (DMB), digital video broadcasting (DVB), or media-FLO.

A method and electronic device for driving a fingerprint sensor according to various embodiments of the present disclosure may reduce the influence of an interference caused from the harmonics of an operating frequency of a fingerprint sensor. Accordingly, an electronic device may prevent the deterioration of antenna radiation performance due to the operating frequency of a fingerprint sensor. Additionally, the recognition rate of a fingerprint sensor may be improved by preventing an interference between a fingerprint sensor and an antenna.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the AP 1010) executes an instruction, it may perform a function corresponding to the instruction. The non-transitory computer-readable storage media may include the memory 1030, for example. At least part of a programming module may be implemented (for example, executed) by the AP 1010, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of various embodiments and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Also, embodiments of the present disclosure disclosed in this specification and drawings are provided as specific examples to describe technical content and help understanding and also do not limit the scope of the present disclosure. Accordingly, it should be construed that besides the embodiments listed herein, all modifications or modified forms derived based on the technical ideas of the present disclosure are included in the scope of the present disclosure.

The invention claimed is:

1. An electronic device comprising:
   a display configured to display a video at a first framerate;
   a wireless communication module configured to perform wireless communication in a first state;
   a fingerprint sensor configured to sense a fingerprint in a second state; and
   at least one processor electrically connected to the display, the wireless communication module, and the fingerprint sensor,
   wherein the processor:
     receives a first signal for notifying an operation of the fingerprint sensor,
     when the first signal is received, reduces the first framerate to a second framerate, and
     when driving of the fingerprint sensor is terminated, returns to display the video at the first framerate.

2. The electronic device of claim 1, wherein each of the first state and the second state comprise at least one of an operating frequency, an operating power, and a circuit path.

3. The electronic device of claim 1, wherein when the first signal is received, the processor changes the second state after receiving the first signal.

4. The electronic device of claim 1, wherein when the first signal is received, the processor changes a transmission power of the wireless communication module in correspondence to the first signal.

5. The electronic device of claim 1, further comprising a plurality of antennas,
   wherein the wireless communication module monitors reception signal characteristics of each of the plurality of antennas and performs antenna switching in response to a control signal of the processor, and
   wherein when the first signal is received, the processor, in response to the first signal, selects at least one antenna among the plurality of antennas as a transmission antenna based on the reception signal characteristics of each of the plurality of antennas.

6. The electronic device of claim 5, wherein the processor determines an antenna having a smallest sensitivity change among the plurality of antennas as the transmission antenna based on the reception signal characteristics of each of the plurality of antennas.

7. The electronic device of claim 1, wherein when the first signal is received, the processor, in response to the first signal, changes a transmission timing of data transmitted by the wireless communication module.

8. The electronic device of claim 7, wherein when the first signal is received, the processor determines to stop transmission of the data by the wireless communication module and when the driving of the fingerprint sensor is terminated, controls the wireless communication module to resume the transmission of the data.

9. The electronic device of claim 1, further comprising a touch panel for detecting a touch variation amount or a hover touch variation amount,
   wherein the touch panel generates the first signal by detecting an intention of fingerprint sensing based on a detected touch variation amount or hover touch variation amount.

10. The electronic device of claim 1, wherein the processor generates the first signal according to an event performed at the electronic device, a screen state of the electronic device, or a type of an application executed on the electronic device.

11. The electronic device of claim 1, wherein the wireless communication module comprises at least one of an antenna, a communication module, a cellular module, a Wi-Fi module, a GPS module, a Bluetooth module, a radio frequency (RF) module, and a near field communication (NFC) module.

12. A method for driving a fingerprint sensor in an electronic device, the method comprising:
   displaying a video at a first framerate;
   performing wireless communication, by a wireless communication module functionally connected to the electronic device in a first state;
   sensing a fingerprint, by a fingerprint sensor functionally connected to the electronic device in a second state;
   receiving a first signal for notifying an operation of the fingerprint sensor;
   when the first signal is received, reducing the first framerate to a second framerate; and
   when the driving of the fingerprint sensor is terminated, returning to display the video at the first framerate.

13. The method of claim 12, wherein each of the first state and the second state comprise at least one of an operating frequency, an operating power, and a circuit path.

14. The method of claim 12, further comprising
changing the second state after the receiving of the first signal.

15. The method of claim 12, further comprising:
changing a transmission power of the wireless communication module in correspondence to the first signal; and
driving the fingerprint sensor when the transmission power of the wireless communication module is changed.

16. The method of claim 12, further comprising:
receiving reception signal characteristics of each of a plurality of antenna of the electronic device;
selecting at least one antenna among the plurality of antennas as a transmission antenna based on the reception signal characteristics of each of the plurality of antennas, in response to the first signal; and
driving the fingerprint sensor when the at least one antenna is selected.

17. The method of claim 12, further comprising:
transmitting data according to a transmission timing of the data determined based on at least part of an operating state of the wireless communication module or the fingerprint sensor in correspondence to the first signal; and
driving the fingerprint sensor when the transmission timing is adjusted.

18. The method of claim 12, further comprising:
when the first signal is received, determining to stop transmission of data by the wireless communication module and when the driving of the fingerprint sensor is terminated, controlling the wireless communication module to resume the transmission of the data.

19. The method of claim 12, further comprising:
detecting a touch variation amount or a hover touch variation amount of a touch panel of the electronic device; and
generating the first signal by detecting an intention of fingerprint sensing based on a touch variation amount or a hover touch variation amount.

20. The method of claim 12, further comprising generating the first signal according to an event performed at the electronic device, a screen state of the electronic device, or a type of an application executed on the electronic device.

21. The electronic device of claim 1, wherein at least one of an operating frequency of the fingerprint sensor, an operating power of the fingerprint sensor, and an operating current of the fingerprint sensor is increased in response to the electronic device entering a lock screen state.

* * * * *